(12) United States Patent
Petruk et al.

(10) Patent No.: US 10,823,877 B2
(45) Date of Patent: Nov. 3, 2020

(54) DEVICES, SYSTEMS, AND METHODS FOR UNDER VEHICLE SURVEILLANCE

(71) Applicant: INTELLIGENT SECURITY SYSTEMS CORPORATION, Woodbridge, NJ (US)

(72) Inventors: Vladimir Petruk, Moscow (RU); Evgeny Savenko, Stavropol (RU); Nataliya Aleshina, Moscow (RU); Andrey Ryabikov, Moscow (RU); Aleksey Pesterev, Moscow (RU); Peter Khatuntsev, Bobrovy Dvory (RU)

(73) Assignee: Intelligent Security Systems Corporation, Woodbridge, NJ (US)

( * ) Notice: Subject to any disclaimer, the term of this patent is extended or adjusted under 35 U.S.C. 154(b) by 0 days.

(21) Appl. No.: 16/250,986

(22) Filed: Jan. 17, 2019

(65) Prior Publication Data

US 2019/0235126 A1    Aug. 1, 2019

Related U.S. Application Data

(60) Provisional application No. 62/619,465, filed on Jan. 19, 2018.

(51) Int. Cl.
| | |
|---|---|
| *H04N 7/18* | (2006.01) |
| *G01V 8/10* | (2006.01) |
| *H04N 5/225* | (2006.01) |
| *H04N 5/262* | (2006.01) |
| *G06T 7/162* | (2017.01) |
| *H04N 5/232* | (2006.01) |

(52) U.S. Cl.
CPC ............... *G01V 8/10* (2013.01); *G06T 7/162* (2017.01); *H04N 5/2256* (2013.01); *H04N 5/23238* (2013.01); *H04N 5/2628* (2013.01); *G06T 2207/30232* (2013.01); *G06T 2207/30252* (2013.01); *H04N 2005/2255* (2013.01)

(58) Field of Classification Search
None
See application file for complete search history.

(56) References Cited

U.S. PATENT DOCUMENTS

| | | |
|---|---|---|
| 6,525,303 B1 | 2/2003 | Gladnick |
| 6,856,344 B2 | 2/2005 | Franz |
| 7,029,935 B2 | 4/2006 | Negley et al. |

(Continued)

FOREIGN PATENT DOCUMENTS

| | | |
|---|---|---|
| CN | 103076641 A | 5/2013 |
| DE | 102011003553 A1 | 8/2012 |

(Continued)

OTHER PUBLICATIONS

International Search Report and Written Opinion of the International Searching Authority, dated May 7, 2019, in corresponding International Application No. PCT/US2019/013907, 9 pages.

*Primary Examiner* — Christopher G Findley
(74) *Attorney, Agent, or Firm* — Dentons US LLP

(57) ABSTRACT

A device includes: a board; a camera coupled to the board, wherein the camera is configured to image an undercarriage based on the undercarriage moving over camera; a light source coupled to the board, wherein the light source is configured to illuminate the undercarriage based on the undercarriage moving over the light source.

30 Claims, 14 Drawing Sheets

(56) References Cited

U.S. PATENT DOCUMENTS

| | | | |
|---|---|---|---|
| 7,102,665 B1* | 9/2006 | Chandler | G01N 21/8806 348/148 |
| 8,067,719 B2 | 11/2011 | Herrera et al. | |
| 8,540,383 B2 | 9/2013 | Pohlert et al. | |
| 8,767,075 B2 | 7/2014 | Bianco | |
| 9,648,256 B2 | 5/2017 | Ramsey et al. | |
| 2003/0185340 A1* | 10/2003 | Frantz | G01N 21/8806 378/57 |
| 2007/0040911 A1* | 2/2007 | Riley | H04N 7/181 348/148 |
| 2008/0136625 A1* | 6/2008 | Chew | G01V 5/0008 340/540 |
| 2008/0239079 A1 | 10/2008 | Millar | |
| 2010/0238290 A1 | 9/2010 | Riley et al. | |

FOREIGN PATENT DOCUMENTS

| | | |
|---|---|---|
| DE | 102012209224 A1 | 12/2013 |
| DE | 102012211791 A1 | 1/2014 |
| DE | 102013212495 A1 | 12/2014 |
| EP | 1854297 A2 | 11/2007 |
| GB | 2516321 A | 1/2015 |
| WO | 2004110054 A1 | 12/2004 |
| WO | 2006071198 A1 | 7/2006 |
| WO | 2006091874 A2 | 8/2006 |
| WO | 2016010441 A1 | 1/2016 |

* cited by examiner

DEVICES, SYSTEMS, AND METHODS FOR UNDER VEHICLE SURVEILLANCE

CROSS-REFERENCE TO RELATED APPLICATIONS

This application claims a benefit of U.S. Provisional Application 62/619,465 filed on Jan. 19, 2018, which is herein incorporated by reference for all purposes.

TECHNICAL FIELD

This disclosure relates to under vehicle surveillance.

BACKGROUND

An undercarriage of a vehicle, such as a car, a bus, or a truck, is often used to smuggle drugs, explosives, stolen goods, or other forms of contraband. As such, an inspection station can be built to monitor the undercarriage in order to minimize smuggling of such items. For example, the inspection station can employ an inspector that operates a mirror mounted onto an end of a stick such that the mirror is positioned underneath the undercarriage and the inspector can visually inspect the undercarriage through the mirror, without having to kneel down or crawl under the vehicle. However, this approach is problematic for several reasons. First, the inspector is placed in a physical danger, i.e., close proximity to potentially harmful substances, such as explosives, caustic chemicals, or others. Second, the inspector generally spends a considerable amount of time inspecting the undercarriage, which often leads to traffic congestion, especially in places where such congestion is not desired at least for security purposes. Third, the inspector may not be optimally focused or sufficiently motivated on thoroughly inspecting the undercarriage, such as via being tired, cold, hot, rushed, distracted, or others, which may cause the inspector to miss an important detail during inspection, thereby limiting the inspector's reliability.

In light of such concerns with manual inspection of the undercarriage, the inspection station may employ, whether overtly or covertly, an automatic system of inspecting the undercarriage. For example, one such system employs a line-scan camera that is stationary. The line-scan camera captures an image of a portion of the undercarriage, as the vehicle is driven over the line-scan camera, and sends the image to a workstation operated by an inspector for a manual analysis of the image. However, this technique is problematic for various reasons. First, the inspector generally spends a considerable amount of time reviewing the image, which often leads to traffic congestion, especially in places where such congestion is not desired at least for security purposes. Second, the inspector may not be optimally focused or sufficiently motivated on thoroughly reviewing the image, such as via being tired, cold, hot, rushed, distracted, or others, which may cause the inspector to miss an important detail in the image, thereby limiting the inspector's reliability. Third, the image is often of poor quality, such as blurry or stretched, as the vehicle can drive over the line-scan camera at inconsistent speeds or impart a significant mechanical vibration to the line-scan camera, as the vehicle approaches or passes over the line-scan camera. Fourth, the line-scan camera is not capable of selectively focusing on a suspicious area of the undercarriage or adjusting an imaging view around a difficult angle. As such, the line-scan camera is unable to inspect various undercarriage areas, such as a wheel well, which are often used for covertly stowing drugs, explosives, stolen goods, and other forms of contraband. Fifth, when no vehicle is present above the line-scan camera, then the line-scan camera is idle, which is inefficient.

Another automatic system of inspecting the undercarriage involves an unmanned ground vehicle (UGV) equipped with a camera, where the UGV moves underneath the vehicle to image the undercarriage, and send such imagery to a workstation operated by an inspector for a manual review of the imagery. However, this technique is also problematic for various reasons. First, the inspector generally spends a considerable amount of time reviewing the image, which often leads to traffic congestion, especially in places where such congestion is not desired at least for security purposes. Second, the inspector may not be optimally focused or sufficiently motivated on thoroughly reviewing the image, such as via being tired, cold, hot, rushed, distracted, or others, which may cause the inspector to miss an important detail in the image, thereby limiting the inspector's reliability. Third, the UGV can provide the inspector with a poor and inconsistent image quality due to frequent image transmission failures, such as due to signal interference, or image blur or jitter, such as due to various movements of the UGV. Fourth, since the UGV has a fixed size, the UGV is unable to effectively adapt to various undercarriage height clearances. Fifth, the UGV is not able to effectively travel along irregular surfaces, such as mud, gravel, or sand. Sixth, the UGV is programmed to operate randomly, as the UGV moves around selected areas of the undercarriage, rather than uniformly imaging the undercarriage, especially longitudinally, which leads to incomplete imaging of the undercarriage. Seventh, the UGV is not able to effectively image certain areas of the undercarriage, such as a wheel well, which are often used for covertly stowing drugs, explosives, stolen goods, and other forms of contraband. Sixth, when the UGV is not used, the UGV is idle, which is inefficient.

Furthermore, the automatic system of inspecting the undercarriage, whether stationary, as the line-scan camera, or mobile, such as the UGV, is often adversely affected by environmental conditions, such as debris or changing weather, or an inability maintain a precise spatial relationship with the undercarriage. For example, the environmental conditions may involve various ambient substances, such as dirt, snow, ice, or mud, that come in contact with various components of the automatic system, thereby impeding its ability operate as designed. Likewise, the environmental conditions may involve hot or cold temperatures that can cause various sensitive components, such as digital image sensors, to perform sub-optimally. Similarly, the inability to maintain and track the precise spatial relationship with the undercarriage can be based on the vehicle's inconsistent speed, direction, elevation, orientation, or others, and may become even more pronounced with the UGV since the UGV may be unable to precisely track its own position, due to movement on regular or irregular surfaces. Therefore, such state of being makes the automatic system becomes even more costly to operate and maintain in order to ensure its reliability.

SUMMARY

Broadly, this disclosure discloses various technologies that address various problems identified above. These technologies generally include a board, a first camera, a light source, a second camera, a processor, and a memory. The first camera includes a wide-angle lens, such as a fish-eye lens. The first camera and the light source are installed onto the board such that the first camera captures a first set of imagery of an undercarriage of a vehicle, as the undercarriage of the vehicle is illuminated via the light source, when the vehicle moves over the board. The second camera captures a second set of imagery of an identifier of the vehicle, such as a license plate. If the first set of imagery is warped, then the processor dewarps the first set of imagery. The processor stitches the first set of imagery such that a template image is formed for storage via the memory. The processor extracts the identifier from the second set of imagery and stores the identifier via the memory such that the template image is logically associated with the identifier. Subsequently, when that vehicle again approaches the board, the first camera captures a third set of imagery of the undercarriage, as the undercarriage of the vehicle is illuminated via the light source, when the vehicle moves over the board. The second camera captures the fourth set of imagery of the identifier of the vehicle. If the third set of imagery is warped, then the processor dewarps the third set of imagery. The processor stitches the third set of imagery such that a current image is formed. The processor employs the identifier, as extracted from the fourth set of imagery, to access the template image, as previously logically associated with the identifier. Then, the processor compares the current image against the template image, such as on a per-block basis, and determines whether a difference exists between the current image and the template image. If the difference exists, then the processor identifies the difference and takes an action, such as generate a request that the difference be labeled or marked. If the difference does not exist, then the processor takes an action, such as generate a request that a gate be opened for the vehicle to pass the gate.

In an embodiment, a device comprising: a board; a camera coupled to the board, wherein the camera is configured to image an undercarriage based on the undercarriage moving over camera; and a light source coupled to the board, wherein the light source is configured to illuminate the undercarriage based on the undercarriage moving over the light source.

In an embodiment, a method comprising: accessing, by a processor, a first imagery of an undercarriage of a vehicle from a first camera and a second imagery of an identifier of the vehicle from a second camera; dewarping, by the processor, the first imagery; stitching, by the processor, the first imagery such that a first image is formed, wherein the first imagery is stitched after the first imagery is dewarped; extracting, by the processor, a set of symbols corresponding to the identifier from the second imagery; storing, by the processor, the first image and the set of symbols in a database such that the first image is retrievable based on the set of symbols; retrieving, by the processor, the first image from the database based on the set of symbols; comparing, by the processor, a second image against the first image, wherein the second image depicts the undercarriage; identifying, by the processor, a difference between the second image and the first image; requesting, by the processor, a display to present the second image with the difference being marked.

In an embodiment, a method comprising:

DETAILED DESCRIPTION

Figure 1:
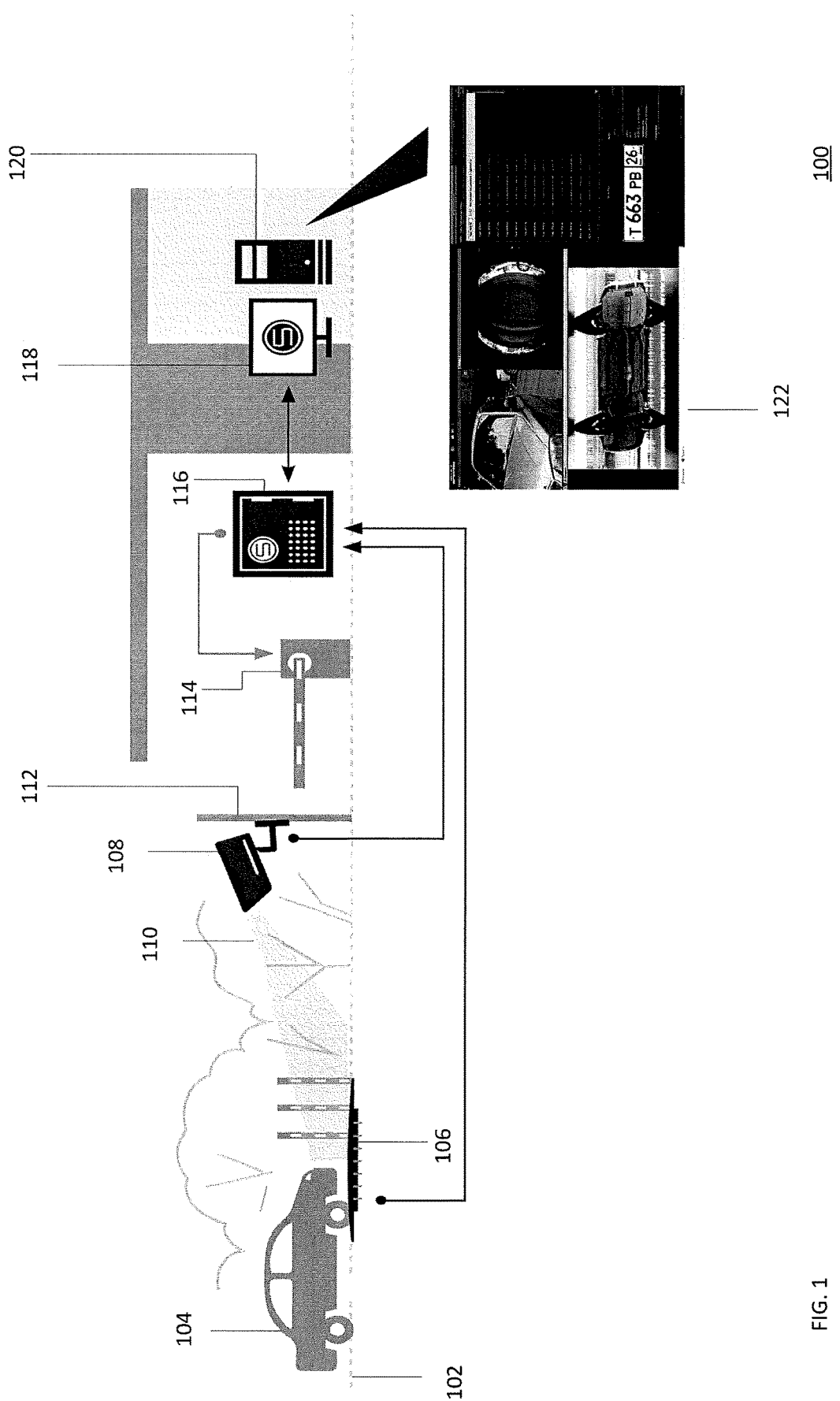
FIG. 1 shows a schematic diagram of an embodiment of an under vehicle surveillance system according to this disclosure.

Generally, this disclosure enables various technologies that address various problems identified above. These technologies generally include a board, a first camera, a light source, a second camera, a processor, and a memory. The first camera includes a wide-angle lens, such as a fish-eye lens. The first camera and the light source are installed onto the board such that the first camera captures a first set of imagery of an undercarriage of a vehicle, as the undercarriage of the vehicle is illuminated via the light source, when the vehicle moves over the board. The second camera captures a second set of imagery of an identifier of the vehicle, such as a license plate. If the first set of imagery is warped, then the processor dewarps the first set of imagery. The processor stitches the first set of imagery such that a template image is formed for storage via the memory. The processor extracts the identifier from the second set of imagery and stores the identifier via the memory such that the template image is logically associated with the identifier. Subsequently, when that vehicle again approaches the board, the first camera captures a third set of imagery of the undercarriage, as the undercarriage of the vehicle is illuminated via the light source, when the vehicle moves over the board. The second camera captures the fourth set of imagery of the identifier of the vehicle. If the third set of imagery is warped, then the processor dewarps the third set of imagery. The processor stitches the third set of imagery such that a current image is formed. The processor employs the identifier, as extracted from the fourth set of imagery, to access the template image, as previously logically associated with the identifier. Then, the processor compares the current image against the template image, such as on a per-block basis, and determines whether a difference exists between the current image and the template image. If the difference exists, then the processor identifies the difference and takes an action, such as generate a request that the difference be labeled or marked. If the difference does not exist, then the processor takes an action, such as generate a request that a gate be opened for the vehicle to pass the gate. Note that although these technologies is described in context of under vehicle surveillance, this technology can be applied to other contexts. For example, this technology can be used with any type of cargo, such as actual machinery/equipment, raw materials, parcel packages, physical letters, food containers, medical devices, intermodal containers, or other goods or forms of structural inspection for logistical systems, distribution systems, supply chain systems, quality control systems, assembly lines, tamper detection systems, or others. Moreover, note that although the under vehicle surveillance is described via optical image capture, these technologies can be applied to non-optical image capture as well, such as via an ultrasound machine, an X-ray machine, an magnetic resonance imaging (MRI) machine, a radar, a lidar, a laser, a heat sensor, or any other form of image capture or formation through any input means or modality.

This disclosure is now described more fully with reference to FIGS. 1-12, in which some embodiments of this disclosure are shown. This disclosure may, however, be embodied in many different forms and should not be construed as necessarily being limited to the embodiments disclosed herein. Rather, these embodiments are provided so that this disclosure is thorough and complete, and fully conveys various concepts of this disclosure to skilled artisans.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

As used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when the present disclosure states herein that something is "based on" something else, then such statement refers to a basis which may be based on one or more other things as well. In other words, unless expressly indicated otherwise, as used herein "based on" inclusively means "based at least in part on" or "based at least partially on."

FIG. 1 shows a schematic diagram of an embodiment of an under vehicle surveillance system according to this disclosure. In particular, an under vehicle surveillance system 100 includes a surface 102, a vehicle 104, a board 106, a camera 108 having a field of vision 110, a wall 112, a gate 114, a server 116, a display 118, a workstation 120, and a graphical user interface (GUI) 122. As such, the under vehicle surveillance system 100 can function as a checkpoint before an entry or an exit of the vehicle 104 into an area, such as a parking lot, a street, or others.

The surface 102 can be of any type, whether regular or irregular, whether smooth or rough, whether extending along a horizontal, vertical, or diagonal plane, whether in a rectilinear, sinusoidal, or arcuate manner, or others. For example, the surface 102 can include asphalt, concrete, pavers, mud, gravel, sand, wood, rubber, metal, plastic, ice, snow, or others. For example, the surface 102 can include a road, a highway, a parkway, a street, a runway, a lot, or others. The surface 102 can be at a ground, below ground, or above ground level. For example, the surface 102 can be exposed to ambient surroundings or covered, such as via a dome, a bridge, a tunnel, a garage, or others. The surface 102 can be heated or be weatherproof. Note that the surface 102 can mobile, such as a moving platform, a conveyor, a truck, a railcar, a trailer, a helicopter, an airplane, a boat, a ferry, or others. For example, the surface 102 can be within a transport vehicle, whether land, marine, or aerial, whether manned or unmanned.

The vehicle 104 can be of any type, whether land, marine, or aerial, whether manned or unmanned, whether wheeled, tracked, or railed, whether for personal, commercial, industrial, governmental, military, or any other use. For example, the vehicle 104 can include a car, a bus, a truck, a van, a jeep, a tank, a tractor, a trailer, a towed transport, a bulldozer, a locomotive, a railcar, a buggy, a rickshaw, a wagon, a trolley, a tram, a funicular, a golf cart, a motorcycle, a skateboard, a carriage, a stroller, a snowboard, a bicycle, a boat, a ship, a submarine, an airplane, a helicopter, a drone, a suitcase, a bed, a wheelchair, a gurney, or any other apparatus or machine that can transport a person or a cargo. For example, the vehicle 104 can include an ambulance or a fire truck. The vehicle 104 includes an undercarriage, which includes at least a portion of an underside of the vehicle 104. For example, the undercarriage can include a chassis, a wheel well, a muffler, a chain, a belt, a transmission, a depression, a projection, or others.

The board 106 is stationed on, below, or above the surface 102 or secured on or to the surface 102 or earth/dirt/soil/ rocks or a structural framework on, below, or above the surface 102, such as via fastening, mating, interlocking, adhering, anchoring, staking, chaining, or others. For example, the board 106 can be bolted through the surface 102 into a soil underneath the surface 102 such that the board 106 is staked and anchored thereby. For example, the board 106 can be flush with the surface 102 or non-flush with the surface 102, whether raised or dropped.

The board 106 is solid, rigid, and rectangularly shaped. However, such structure can vary where the board 106 can be perforated or meshed or latticed, flexible, or shaped as a square, a circle, an oval, a triangle, a trapezoid, a pentagon, a heptagon, an octagon, a disc, a ring, a U-portion, a J-portion, a W portion, an M portion, a D portion, an E-portion, a T-portion, an S-portion, an F-portion, an H-portion, an L-portion, an arcuate portion, a sinusoidal portion, a pulse-shaped portion, a zigzag-shape portion, an hourglass shape portion, or others, whether open or closed shape, whether having a uniform or varying length, width, or height along a horizontal, vertical, or diagonal plane. The board 106 can include a depression or a projection. The board 106 can include metal, plastic, rubber, wood, or others. The board 106 can be weatherproof. Accordingly, the board 106 is configured such that the vehicle 104 can travel on or over or rest on or over the board 106.

The board 106 is configured to output a light and capture an image of the undercarriage of the vehicle 104 based on the light, such as via a reflection of the light off the undercarriage of the vehicle 104, as the vehicle 104 approaches the board 106 or moves over the board 106 or passes the board 106 or rests on the board 106, as further disclosed below. The board 106 is positioned such that the board 106 longitudinally extends along a width of the vehicle 104. However, this positioning can vary where the board 106 is positioned such that the board 106 longitudinally extends along a length of the vehicle 104 or such that the board 106 longitudinally extends along a diagonal of the vehicle 104. For example, the board 106 can be positioned traverse to the longitude of the vehicle 104. The board 106 is powered via a mains electricity source, such as via a power cable or a data cable. Note that the board 106 can be powered via at least one of an onboard rechargeable battery, such as a lithium-ion battery, which may be charged via an onboard renewable energy source, such as a photovoltaic cell, a wind turbine, or a hydropower turbine. Note that the board 106 can host a sensor configured to sense at least one of a presence or an absence of the vehicle 104 in operational proximity thereof, which can be within operational proximity of the camera 108. For example, the sensor can be an optical sensor, a ultrasonic sensor, an ultrasound sensor, a laser sensor, a radar, a lidar, a heat sensor, an actuator, a mechanical linkage, a load cell, a pressure sensor, a ferromagnetic sensor, or others. For example, the sensor can be coupled to the board 106 via fastening, mating, interlocking, adhering, or others. In some embodiments, the sensor can be an all-weather sensor. Note that the sensor can be hosted via the surface 102 or the wall 112.

The camera 108 has the field of vision 110. The camera 108 includes an optical instrument for capturing and recording images from the field of vision 108, and the images may be stored locally, transmitted to another location, or others. The images may be individual still photographs or sequences of images constituting videos. The images can be analog or digital, whether color or grayscale. For example, the camera 108 can be a pan-tilt-zoom (PTZ) camera, which may be a virtual PTZ camera, an infrared camera, a non-line-scan camera, or others. The camera 108 can comprise any type of lens, such as convex, concave, wide-angle, fisheye, or others. The camera 108 can comprise any focal length, such as wide angle or standard. The camera 108 can be stationary or movable. The camera 108 is powered via a mains electricity source, such as via a power cable or a data cable. Note that the camera 108 can be powered via at least one of an onboard rechargeable battery, such as a lithium-ion battery, which may be charged via an onboard renewable energy source, such as a photovoltaic cell, a wind turbine, or a hydropower turbine. The camera 108 can be configured for geo-tagging, such as via modifying an image file with a set of geolocation or coordinates data. The camera 108 can include or be coupled to a microphone. The camera 108 can be configured for a name-stamping, date-stamping, or time-stamping the image, such as what date or time the image was captured or naming the image with a naming convention, as pre-programmed in advance. The camera 108 can comprise a flash illumination output device or another artificial illumination output device. Note that the camera 108 can comprise an infrared illumination output device. The camera 108 is positioned such that the field of vision 110 captures an identifier of the vehicle 104, such as a vehicle registration plate or others, such as a license plate or others. For example, when the vehicle 104 includes a cabin and hosts the identifier on or in the cabin, then the camera 108 can be oriented towards the area. Note that in poor illumination conditions, such as darkness, the flash illumination output device can output a light to assist the camera 108. Note that the identifier can be captured non-optically, such as via a radio frequency interrogation, an acoustic identification, a thermal signature, a weight value, or others. As such, in these embodiments, a suitable sensor can be used, whether additional or alternative to the camera 108. The camera 108 can be weatherproof. Note that the system 100 can be configured for a bilateral operation mode (entry and exit). As such, the system 100 can include another camera 108 that is in communication with the server 116 in order to capture the identifier from a front or back portion of the vehicle 104. Note that the cameras 108 can be identical to or different from each other in structure or mode of capture. Note that the system 100 can include a camera configured to provide a surveillance overview of the system 100 or a locale in which the system 100 is installed. For example, such camera can be configured as the camera 108, whether in structure or mode of capture, and can be in communication with the server 116, similar to the camera 108.

The wall 112 hosts the camera 108, such as via fastening, mating, interlocking, adhering, or other securing techniques. Although the wall 112 extends vertically with respect to the surface 102, the wall 112 can extend horizontally or diagonally with respect to the surface 102. The wall 102 can include metal, plastic, wood, rubber, concrete, bricks, leather, siding, drywall, or others. The wall 112 can be a part of another structure, whether stationary or mobile, such as a building or a vehicle, or stand by itself, such as a post. The wall 112 can be weatherproof.

The gate 114 includes an entrance or exit gate that can be opened or closed via a power mechanism, which can be electric, such as a motor, an actuator, or others. However, note that the power mechanism can include a hydraulic system, a pneumatic system, or others. For example, the gate 114 is powered via a mains electricity source, such as via a power cable or a data cable. Note that the gate 114 can be powered via at least one of an onboard rechargeable battery, such as a lithium-ion battery, which may be charged via an onboard renewable energy source, such as a photovoltaic cell, a wind turbine, or a hydropower turbine. The gate 114 can include a swing gate, whether articulated, underground, or sliding. The gate 114 can be weatherproof.

The server 116 includes a processor and a memory coupled to the processor. For example, the processor can be a single core, a multi core, or others. For example, the memory can include a mechanical memory, an electronic memory, or others. For example, the memory can include a semiconductor memory, such as a flash memory or others. The memory stores a set of instructions that are executable by the processor for performance of various operations, as further disclosed below. The server 116 is in communication with the board 106, the camera 108, the gate 114, and the workstation 120. Such communication can be wired, wireless, or waveguide based. For example, such communication can be over a network, which can include a plurality of nodes that allow for sharing of resources or information. For example, the network 102 can be a local area network (LAN), a wide area network (WAN), a cellular network, or others. The server 116 is powered via a mains electricity source, such as via a power cable or a data cable.

The server 116 can run an operating system, which can be embedded, such as Windows®, or others, and an application, such as a video analytics application, on the operating system. The server 116 can include or be coupled to an input device, such as a mouse, a keyboard, a camera, whether forward-facing or back-facing, an accelerometer, a touchscreen, a biometric reader, a clicker, a microphone, or any other suitable input device. The server 116 can include or be coupled to, an output device, such as a display, a speaker, a headphone, a printer, or any other suitable output device. Note that the input device and the output device can be embodied in one unit, such as a touch-enabled display, which can be haptic. Note that the server 116 can host a database which includes a data structure suitable for storing a set of data of any format, such as images, sounds, text, or others. For example, the database can be a relational database, an in-memory database, a NoSQL database, a graphical database, or others, which can store data, such as in a record field, and allow access to such data, whether in a raw state, a formatted state, an organized stated, or any other accessible state. For example, such data can include an image file, a sound file, a text file, an alphanumeric text string, or any other data. The database is configured for various data Input/Output (I/O) operations, including reading, writing, editing, modifying, deleting, updating, searching, selecting, merging, sorting, encrypting/decrypting, de-duplicating, or others.

The workstation 120 is operably coupled, whether wired, wireless, or waveguide, to the display 118, which can be touch-enabled or haptic. The workstation 120 runs an operating system, such as Windows®, or others, and an application, such as an administrator application, on the operating system. For example, the workstation 120 can be embodied as a terminal, a kiosk, a laptop, a tablet, a smartphone, a vehicle, whether manned or unmanned, whether land, aerial, or marine, or others. The workstation 120 can include or be coupled to an input device, such as a mouse, a keyboard, a camera, whether forward-facing or back-facing, an accelerometer, a biometric reader, a clicker, a microphone, or any other suitable input device. The workstation 120 can include or be coupled to an output device, such as a speaker, a headphone, a printer, or any other suitable output device.

Note that the input device and the output device can be embodied in one unit, such as a touch-enabled display, which can be haptic. As such, the application presents the GUI 122 depicting a page, where the page can include a visual element, such as a menu, enabling a control of an aspect of the system 100, such as any hardware, software, or any other logic or functionality. For example, the workstation 120 can be configured to control at least one of the board 106, the camera 108, the gate 114, the server 116. As shown in FIG. 1, the GUI 122 concurrently depicts the vehicle 104, the identifier of the vehicle 104, an image of a portion of the undercarriage of the vehicle 104, an image of the undercarriage of the vehicle 104, and a menu.

In one mode of operation, the server 116 receives a first imagery of the undercarriage of the vehicle 104 from the board 106 and a second imagery of the identifier of the vehicle 104 from the camera 108. The server 116 dewarps the first imagery, if necessary, and stitches the first imagery such that a first image is formed. The server 116 extracts a set of symbols corresponding to the identifier from the second imagery. The server 116 stores the first image and the set of symbols in a database such that the first image is retrievable based on the set of symbols. As such, the first image functions as a template or reference image for the identifier. Subsequently, when the vehicle 104 again approaches the board 106, the server 116 receives a third imagery of the undercarriage of the vehicle 104 from the board 106 and a fourth imagery of the identifier of the vehicle 104 from the camera 108. The server 116 dewarps the third imagery, if necessary, and stitches the third imagery such that a second image is formed. The server 116 extracts the set of symbols corresponding to the identifier from the fourth imagery. The server 116 retrieves the first image from the database based on the set of symbols, as currently extracted and previously matched to the set of symbols stored in the database. The server 116 compares the second image against the first image and identifies a difference, such as a structural change or a color change, between the second image and the first image. The server 116 takes an action or avoid taking the action if the difference exists. For example, the server 116 can request the display 118 to present the second image via the GUI 112 such that the second image is augmented, such with the difference being marked. Likewise, the server 116 can take an action or avoid taking the action if the difference does not exist. For example, the server 116 can request a motor to activate responsive to no substantial difference (e.g. at least about 51, 55, 60, 65, 70, 75, 80, 85, 90, or 95 similar or identical in pixel coloration or patterns) between the second image and the first image being determined, whether via an operator of the workstation 120 or via the server 116, such as based on a set of criteria or thresholds, as preprogrammed in advance. For example, the gate 114 can include the motor and thereby be opened such that the vehicle 104 can move past the gate.

Figure 2:
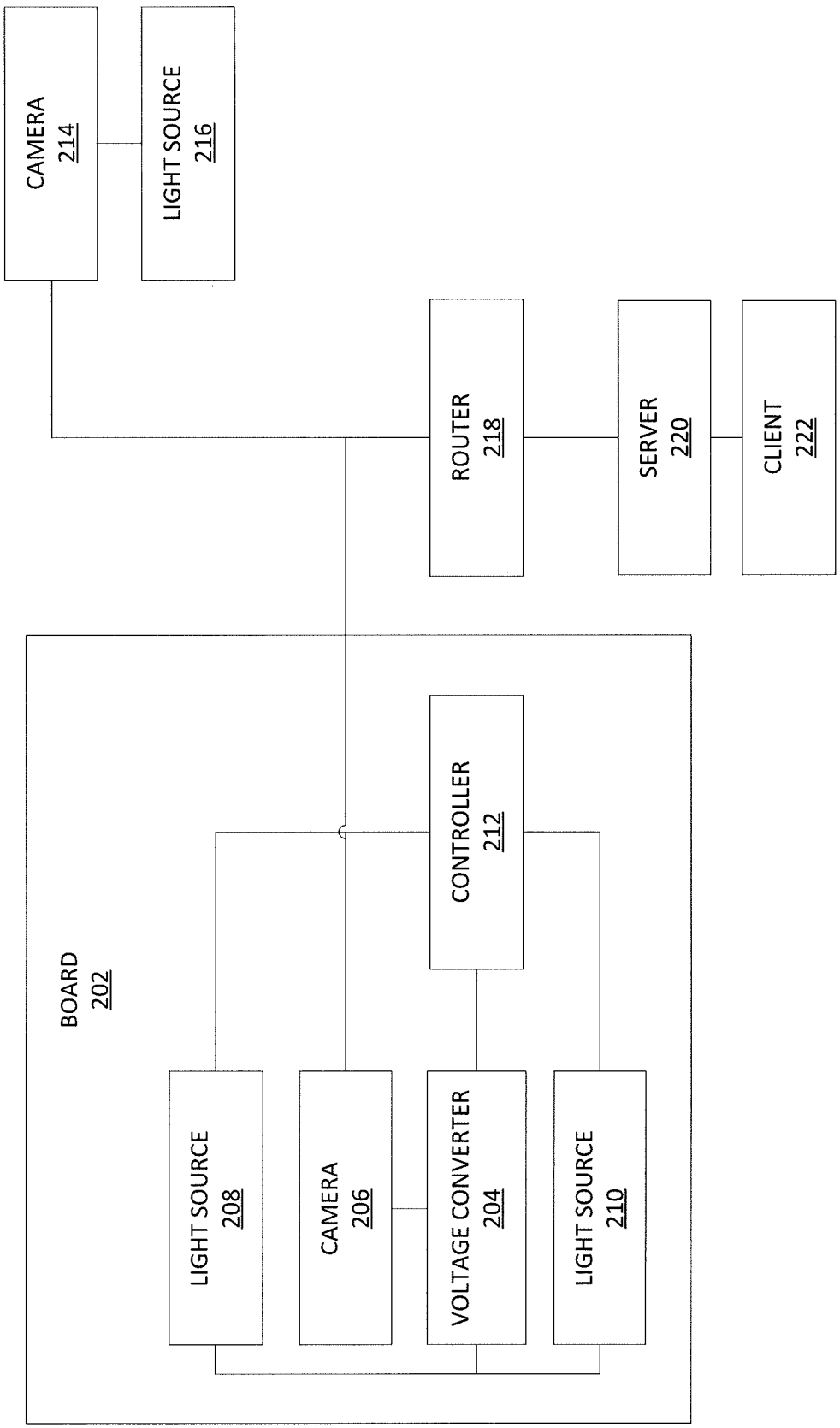
FIG. 2 shows a logical diagram of an embodiment of an under vehicle surveillance system according to this disclosure.

FIG. 2 shows a logical diagram of an embodiment of an under vehicle surveillance system according to this disclosure. In particular, a system 200 includes a board 202, a camera 214, a light source 216, a router 218, a server 220, and a client 222. The board 202 includes a voltage converter 204, a camera 206, a plurality of light sources 208, 210, and a controller 212. The voltage converter 204 is in communication with an electrical power source, whether hosted via the board 202 or off the board 202. For example, the electrical power source can include a mains electricity source, such as a power line. For example, the electrical power source can include a battery, which can be rechargeable. The voltage converter 204 is in communication with the controller 212, the camera 206, and the light sources 208, 210, whether such communication is wired, wireless, or waveguide based. The controller 212 is in communication the light sources 208, 210, whether such communication is wired, wireless, or waveguide based. The controller 212 can be in communication with the camera 206, whether such communication is wired, wireless, or waveguide based. The camera 206 is in communication with the router 218, whether such communication is wired, wireless, or waveguide based. The controller 212 can be in communication with the router 218, whether such communication is wired, wireless, or waveguide based. The server 220 is in communication with the router 218 and the client 222, whether such communication is wired, wireless, or waveguide based. The router 218 is in communication with the camera 214, whether such communication is wired, wireless, or waveguide based. The camera 214 is in communication with the light source 216, whether such communication is wired, wireless, or waveguide based. Note that any such manners of communication can be identical to or different from each other.

The board 202 hosts the voltage converter 204, such as via fastening, mating, interlocking, adhering, or others. The voltage converter 204 is an electric power converter. As such, the voltage converter 204 is configured to (1) receive a voltage from the electric power source, and (2) change, such as via decreasing, the voltage such that the voltage, as changed, can be supplied to the controller 212, the camera 206, and the light sources 208, 210 to power the controller 212, camera 202, and the light sources 208, 210. The voltage converter 204 may be combined with other components to create a power supply. For example, the voltage converter 204 can be configured to convert an alternating current (AC) voltage via a transformer.

The board 202 hosts the camera 206, such as via fastening, mating, interlocking, adhering, or others. The camera 206 can be similar to the camera 108, but is configured to image the undercarriage of the vehicle 104, as disclosed above. For example, the camera 206 can include a matrix Internet Protocol (IP) camera with a wide angle lens, such as a fisheye lens. As such, the camera 206 can be configured to capture an image in a high resolution, such as at 1200 by 1800 pixels at 72 dots per inch (DPI) or lower or higher. Note that the wide angle lens can enable the camera 206 to have a field of view sufficient to image the undercarriage of the vehicle 104 across the width of the vehicle 104, which can include a wheel of the vehicle 104. Further, note that when the camera 206 videos the undercarriage of the vehicle 104, each frame of that video sequence can show only a part of the undercarriage (in length). As such, the camera 206 can form a set of images of the undercarriage of the vehicle 104 as the vehicle 104 is passing over the camera 206, where the set of images can be stitched, whether via the camera 206 or via the server 220, to generate a single image of depicting the undercarriage of the vehicle 104. When the server 220 stitches the set of images, then the camera 206 is configured to send the set of images to the server 220 via the router 218. Otherwise, the camera 206 can send the single image to the server 220 via the router 218.

The board 202 hosts the light sources 208, 210, such as via fastening, mating, interlocking, adhering, or others, whether identical to or different from each other. For example, the light sources 208, 210 can be a block of light sources that extends about the camera 206. The light sources 208, 210 operate as a plurality of flash illumination output devices or other artificial illumination output devices, such as a plurality of infrared illumination output devices, such that the camera 206 can image the undercarriage of the vehicle 104 as the undercarriage of the vehicle 104 is illuminated via the light sources 208, 210. Note that the light sources 208, 210 are configured to output a plurality of lights, whether the lights are identical to or different from each other in illumination characteristics, such as frequency, wavelength, visibility, color, brightness, or others, or mode of illumination, such as flashing, continuous, or others, or other properties. The light sources 208, 210 can include a light emitting diode (LED). The light sources 208, 210 can work in a pulsed mode (synchronized in frequency with the camera 206 through the controller 212) or in a constant mode, such as lighting without visibly pulsing or others. As such, the light sources 208, 210 are positioned on the board 202 and activated such that the lights output via the light sources 208, 210 provide a uniform illumination of the undercarriage of the vehicle 104. Note that when the vehicle 104 is not over the board 202 or not in operational proximity of the camera 206 or the camera 214, then the light sources 208, 210 operate in a standby mode drawing low power from the voltage converter 204.

The camera 214 is similar to the camera 108. For example, the camera 214 can include an IP camera, which can be installed in conjunction (coaxial) with a projector of an infrared or visible light to enable a capture of the identifier in poor illumination conditions, such as at nighttime. Note that the camera 214 can be oriented such that its field of view, such as the field of view 110, is able to image a front or back portion of the vehicle 104, which can include the identifier, when the vehicle 104 is moving toward or onto or over the board 202. The camera 214 can output to the server 220 via the router 218. The light source 216 similar to the flash illumination output device or another artificial illumination output device, such as an infrared illumination output device, as disclosed above. The light source 216 operates in conjunction with the camera 214 to aid the camera 214 in imaging.

The controller 212 is configured to control the light sources 208, 210, as powered via the voltage converter 204. The router 218 is a network communication device that routes communications to or from the camera 206, the camera 214, the server 220, whether in a wired, wireless, or waveguide manner. Note that the controller 212 or the client 222 can communicate with the router 218.

The server 220 can be configured to receive or archive a video stream as received from the camera 214 or from the camera configured to provide the surveillance overview of the system 100 or the locale in which the system 100 is installed, if this camera is present. Likewise, the server 220 can be configured to receive, compress, or archive a video stream from the camera 206. Moreover, the server 220 can be configured to recognize the identifier of the vehicle 104 from the video stream of the camera 214. Also, the server 220 can be configured to stitch the set of images from the video stream of the camera 206 into the single image. Additionally, the server 220 can be configured to compare the single image to a reference or template image, as disclosed above. Furthermore, the server 220 can be configured to serve the GUI 122 to the client 222. The server 220 can host the database, as explained above.

For example, the server 220 can read, write, edit, delete, or retrieve an image, whether a template or current image, from or into the database, such as when the image is logically associated with the vehicle identifier, as captured via the camera 214 and sent to the server 220 via the router 218. The client 222 is similar to the workstation 120. Moreover, note that the client 222 is configured to enable a synchronized viewing of live or archived video from the camera 206, the camera 214, or any other cameras with which the server 220 is in communication with, such as a surveillance camera or others. Also, the client 222 can be configured to view imagery of the undercarriage of the vehicle 104 or any other image processing based on such imagery, such as image markings based on comparing the imagery against a reference or template imagery, as previously created. Further, the client 222 can be configured to manage or control any protecting devices, such as gates, barriers, or others, traffic lights, display boards (with appropriate integration), or others. Additionally, the client 222 can be configured interact with higher level systems (with appropriate integration).

Figure 3A:
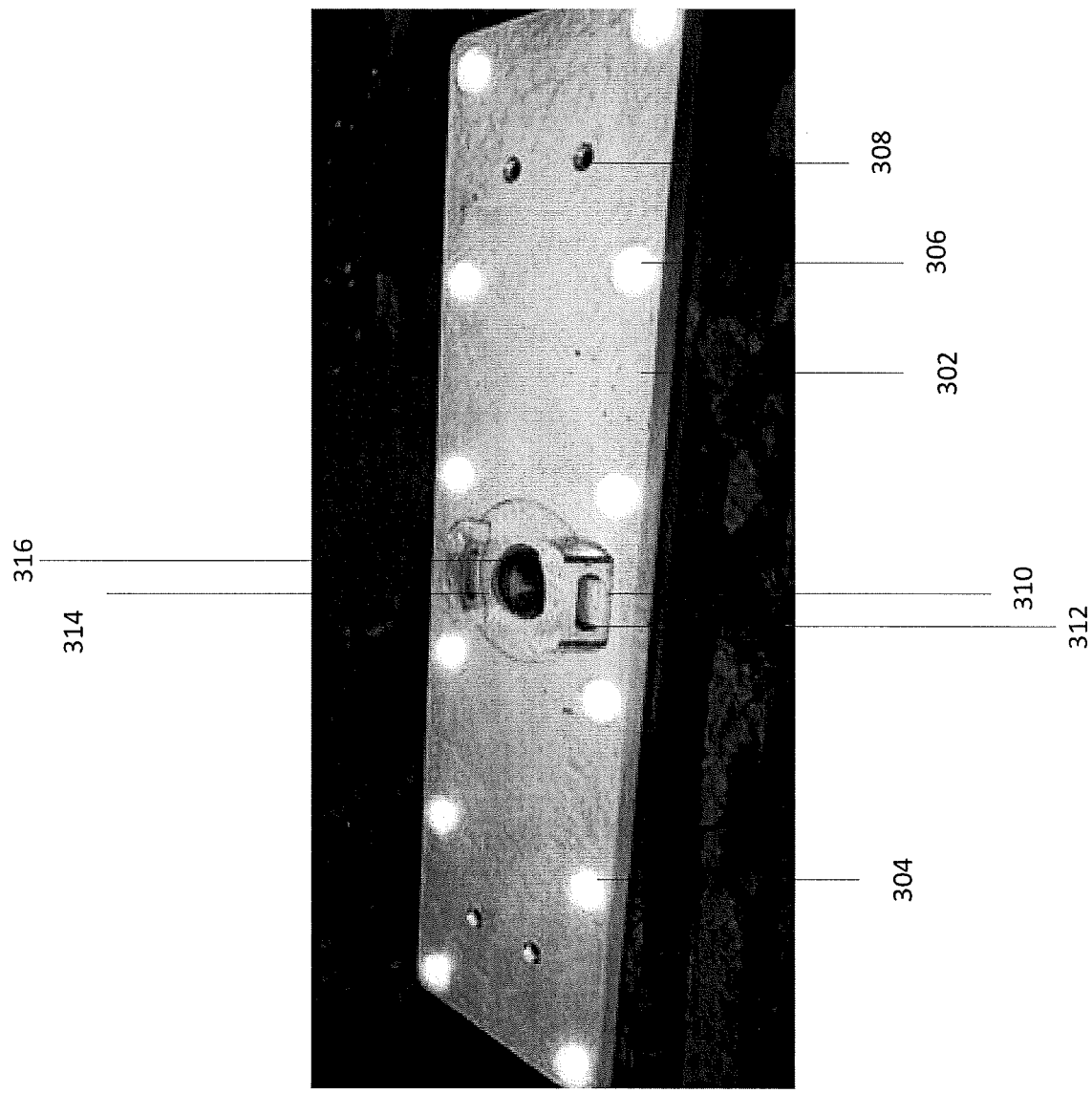
FIGS. 3A-3C show an embodiment of a board according to this disclosure.
Figure 3B:
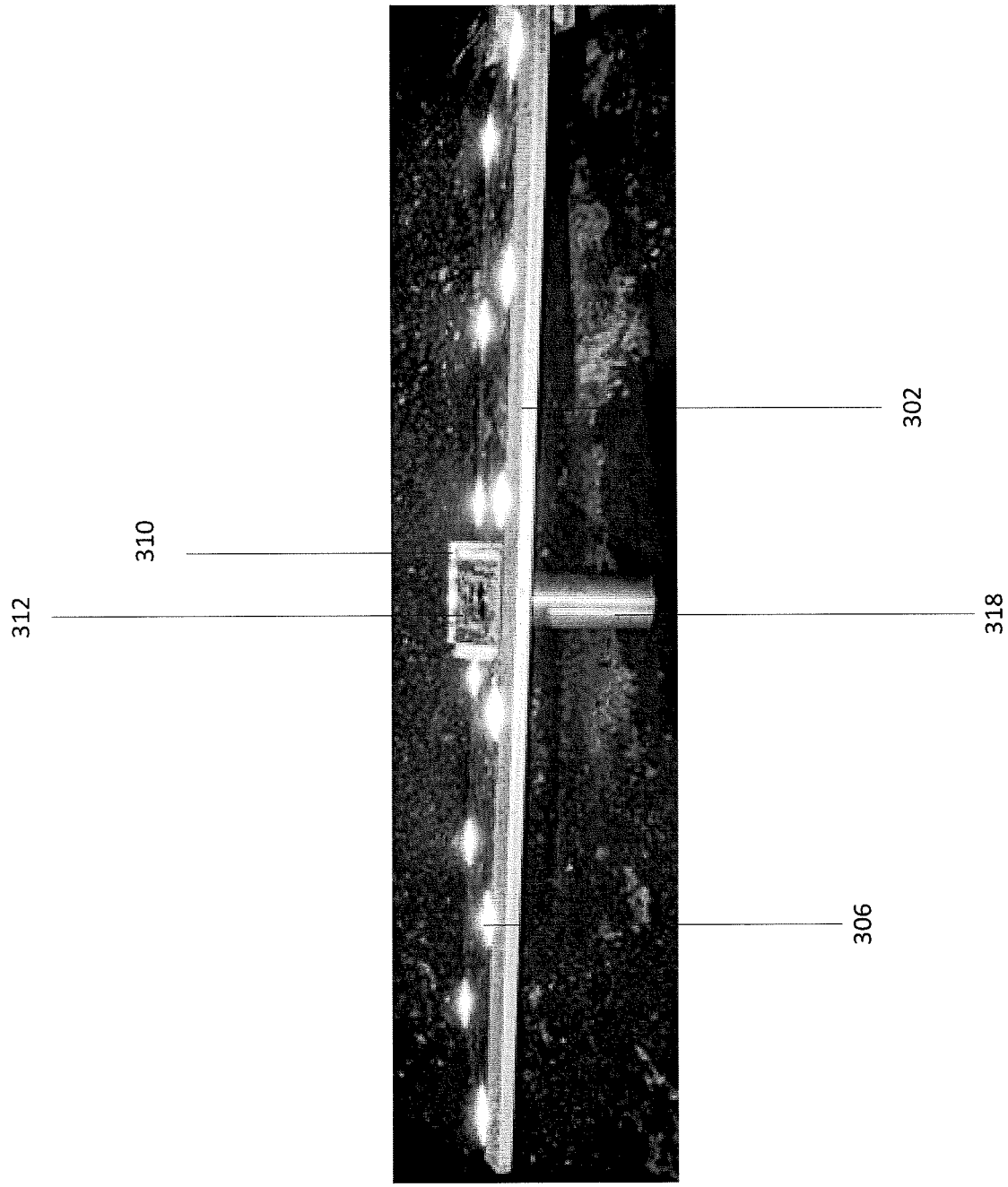
Figure 3C:
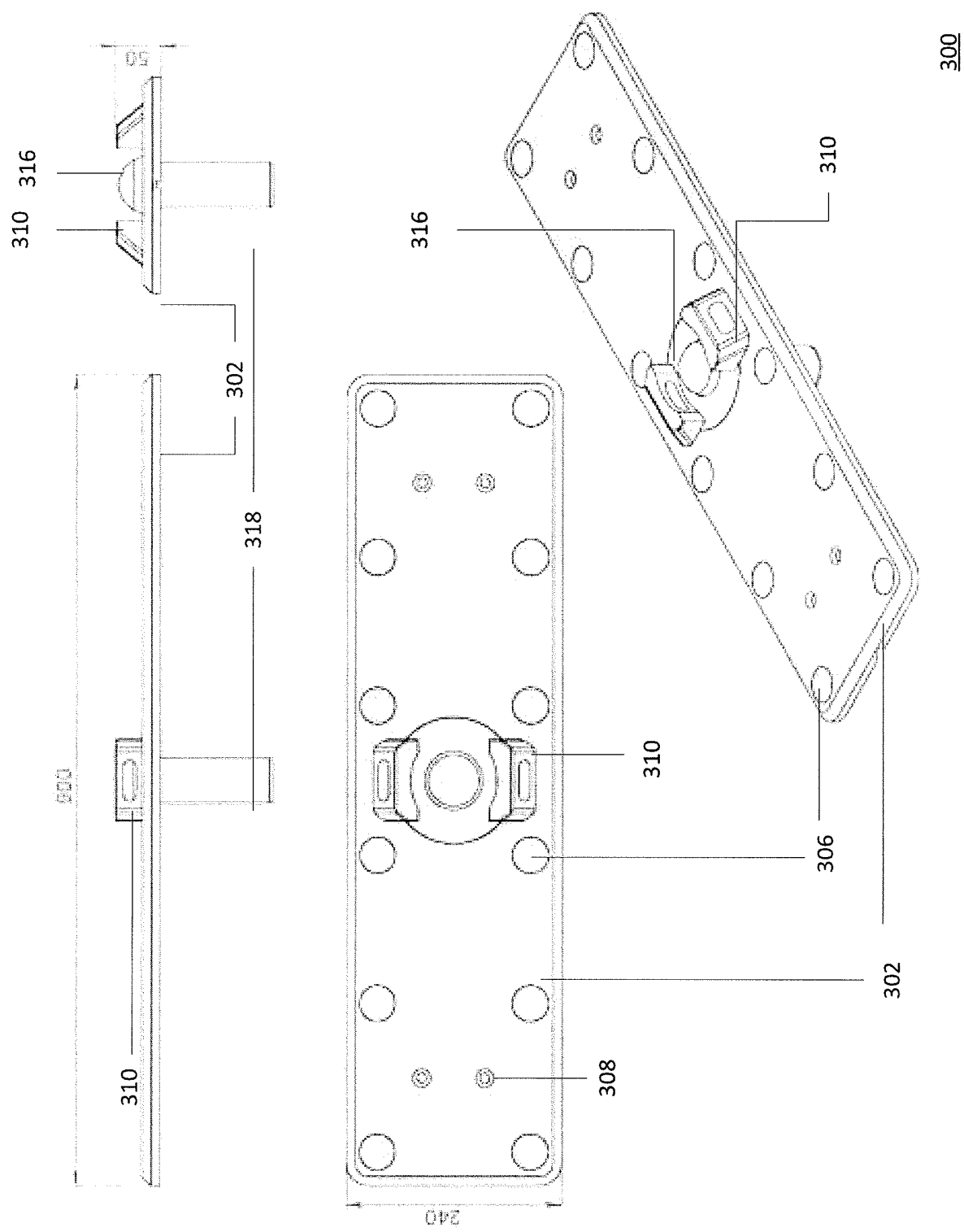

FIGS. 3A-3C show an embodiment of a board according to this disclosure. In particular, a board 300 is similar to the board 106 or 202. The board 300 includes a body 302, a plurality of wells 304, a plurality of light sources 306, a plurality of sets of bores 308, a plurality of walls 310, a plurality of openings 312, a well 314, a camera 316, and a stem 318. The body 302 is solid, rigid, and rectangularly shaped. However, such structure can vary where the body 302 can be perforated or meshed or latticed, flexible, or shaped as a square, a circle, an oval, a triangle, a trapezoid, a pentagon, a heptagon, an octagon, a disc, a ring, a U-portion, a J-portion, a W-portion, an M-portion, a D-portion, an E-portion, a T-portion, an S-portion, an F-portion, an H-portion, an L-portion, an arcuate portion, a sinusoidal portion, a pulse-shaped portion, a zigzag-shape portion, an hourglass shape portion, or others, whether open or closed shape, whether having a uniform or varying length, width, or height along a horizontal, vertical, or diagonal plane. The body 302 can include a depression or a projection. The body 302 include metal, but can include plastic, rubber, wood, or others. The body 302 can be weatherproof. Accordingly, the body 302 is configured such that the vehicle 104 can travel on or over or rest on or over the body 302.

The body 302 defines the wells 304 therein. The wells 304 are circular, but can be shaped differently, such as a square, a circle, an oval, a triangle, a trapezoid, a pentagon, a heptagon, an octagon, or others. The wells 304 can be internally tapered or uniform or smooth or threaded. The wells 304 are distributed along a periphery of the body 302 in a closed shape manner, but open shape manner is possible. Although the wells 304 are positioned longitudinally in opposing pairs, variations in such positioning are possible, such as the wells 304 being positioning longitudinally not in pairs or offset or other ways. Note that some of the wells 304 can include bores through the body 302.

The wells 304 host the light sources 306, such as via fastening, mating, interlocking, adhering, or others, whether identical to or different from each other. The light source 306 are similar to the light sources 208, 210. The light sources 306 are configured to output a plurality of lights onto the undercarriage of the vehicle 104 such that the camera 316 can capture a set of images of the undercarriage of the vehicle 104 based on the lights, such as via a plurality of reflections of the lights off the undercarriage of the vehicle 104, as the vehicle 104 approaches the body 302 or moves over the body 302 or passes the body 302 or rests on the body 302, as further disclosed below. For example, the light sources 306 operate as a plurality of flash illumination output devices or other artificial illumination output devices, such as a plurality of infrared illumination output devices, such that the camera 316 can image the undercarriage of the vehicle 104 as the undercarriage of the vehicle 104 is illuminated via the light sources 306. Note that the light sources 306 are configured to output a plurality of lights, whether the lights are identical to or different from each other in illumination characteristics, such as frequency, wavelength, visibility, color, brightness, or others, or mode of illumination, such as flashing, continuous, or others, or other properties. The light sources 306 can include a set of LED bulbs, incandescent bulbs, fluorescent bulbs, halogen bulbs, or others. The light sources 306 can work in a pulsed mode (synchronized in frequency with the camera 316 through the controller 212), or in a constant mode, such as lighting without visibly pulsing or others. Note that the light sources 306 can be flush with the body 302 or not flush with the body 302, such as via being set higher or lower than an upper surface of the body 302. As such, the light sources 306 are positioned on the body 302 and activated such that the lights output via the light sources 306 provide a uniform illumination of the undercarriage of the vehicle 104. Note that the body 302 can define a trench between the wells 304, such as for running a wire of the light sources 306 or the camera 316, although the wire can be internal to the body 302. Further, note that the body 302 can include a trench extending in a closed shape, such as an O-shape, a D-shape, a rectangular shape, a square shape, a circular shape, an oval or ovoid shape, a pentagonal shape, an octagonal shape, a triangular shape, or others. Note that the trench can include a solid, perforated, latticed, or meshed bottom side. Moreover, the light sources 306 can include a line of light sources 306 hosted on the body 302, such as within the trench, whether the light sources 306 operate serially or in parallel.

The body 302 defines the sets of bores 308 such that the sets of bores 308 are distal to the periphery of the body 302. The sets of bores 308 include bores that are circular, but can be shaped differently, such as a square, a circle, an oval, a triangle, a trapezoid, a pentagon, a heptagon, an octagon, or others. The sets of bores 308 can be internally tapered or uniform. For example, sets of bores 308 can include bores that are countersunk. Although the sets of bores 308 are positioned longitudinally in opposing pairs, variations in such positioning are possible, such as the sets of bores 308 being positioning longitudinally not in pairs or offset or other ways. Note that the body 302 can be bolted onto the surface 102 via a set of bolts or stakes extending through the sets of bores 308.

The body 302 hosts the walls 310, where the walls 310 include the openings 312. The body 302 includes an upper side from which the walls 310 extend, while opposing each other, although variations on this extension are possible, such as when the walls 310 are not opposing each other or offset with each other. The walls 310 can extend perpendicularly or non-perpendicularly from the upper side. The walls 310 are unitary or monolithic to the body 302, although the walls 310 can be assembled to the body 302, such as via fastening, mating, interlocking, adhering, or others. The walls 310 are solid, rigid, and U-shaped. However, such structure can vary where the walls 310 can be perforated or meshed or latticed, flexible, or shaped as a square, a circle, an oval, a triangle, a trapezoid, a pentagon, a heptagon, an octagon, a disc, a ring, a J-portion, a W portion, an M portion, a D portion, an E-portion, a T-portion, an S-portion, an F-portion, an H-portion, an L-portion, an arcuate portion, a sinusoidal portion, a pulse-shaped portion, a zigzag-shape portion, an hourglass shape portion, or others, whether open or closed shape, whether having a uniform or varying length, width, or height along a horizontal, vertical, or diagonal plane. The walls 310 can include a depression or a projection. The walls 310 include metal, but can include plastic, rubber, wood, or others. The walls 310 can be weatherproof. Accordingly, the walls 310 are structured to protect the camera 316 from impact or pressure of a wheel or roller of the vehicle 104 as the vehicle 104 moves over the board 300.

Note that although the walls 310 extend longitudinally along a length of the upper side of the body 302, the walls 310 can extend longitudinally along a width of the upper side of the body 302, while still enabling the camera 316 to image, such as via being transparent or sized based on the camera 316 or others. Further, note that although the walls 310 are not in contact with each other, the walls 310 can be in contact with each other, whether defining an open or closed shape, such as a U-portion, a V-portion, a C-portion, an 0-portion, a D-portion, a square, a circle, an oval, a triangle, a trapezoid, a pentagon, a heptagon, an octagon, a disc, a ring, a J-portion, a W portion, an M portion, an E-portion, a T-portion, an S-portion, an F-portion, an H-portion, an L-portion, an arcuate portion, a sinusoidal portion, a pulse-shaped portion, a zigzag-shape portion, an hourglass shape portion, or others. The openings 312 are positioned such that the camera 316 is able to image therethrough. The openings 312 can be of any shape, such as an 0-portion, a D-portion, a square, a circle, an oval, a triangle, a trapezoid, a pentagon, a heptagon, an octagon, or others. Note that the body 302 can lack at least one of the walls 310. Further, note that the walls 310 can be central to the body 302 or not central to the body 302.

The body 302 defines the well 314 therein. The well 314 is circular, but can be shaped differently, such as a square, a circle, an oval, a triangle, a trapezoid, a pentagon, a heptagon, an octagon, or others. The well 314 can be internally tapered or uniform or smooth or threaded. The well 314 is positioned between the walls 310 and distal from the periphery of the of the body 302. Note that the well 314 can be central to the body 302 or not central to the body 302. Further, note that the well 314 can include a bore through the body 302.

The well 314 hosts the camera 316 therein, such as via fastening, mating, interlocking, adhering, or others, whether identical to or different from each other. Note that the camera 316 is covered by a dome that is rigid and transparent, which can include glass, plastic, or others. However, note that the dome can be opaque or translucent. The camera 316 is similar to the camera 206. The camera 316 has a field of vision. The camera 316 includes an optical instrument for capturing and recording images from the field of vision, and the images may be stored locally, transmitted to another location, or others. The images may be individual still photographs or sequences of images constituting videos. The images can be analog or digital, whether color or grayscale. For example, the camera 316 can be a PTZ camera, which may be a virtual PTZ camera, an infrared camera, or others. The camera 316 can comprise any type of lens, such as convex, concave, wide-angle, fisheye, or others. The camera 316 can comprise any focal length, such as wide angle or standard. The camera 316 can be stationary or movable. The camera 316 can be powered via a mains electricity source, such as via a power cable or a data cable. The camera 316 can be powered via at least one of an onboard rechargeable battery, such as a lithium-ion battery, which may be charged via an onboard renewable energy source, such as a photovoltaic cell, a wind turbine, or a hydropower turbine. The camera 316 can be configured for geo-tagging, such as via modifying an image file with a set of geolocation or coordinates data. The camera 316 can include or be coupled to a microphone. The camera 316 can be configured for a name-stamping, date-stamping, or time-stamping the image, such as what date or time the image was captured or naming the image with a naming convention, as pre-programmed in advance. The camera 316 can be weatherproof.

The stem 318 extends longitudinally from the body 302 in a perpendicular manner such that a T-shape is defined thereby. However, note that such structure can vary, such as via the stem 318 extending longitudinally from the body 302 in a non-perpendicular manner or a different shape is defined thereby, such as an L-shape, a J-shape, or others. The stem 318 is unitary or monolithic to the body 302, although the stem 318 can be assembled with the body 302, such as via fastening, mating, interlocking, adhering, or others. The stem 318 extends longitudinally in a rectilinear manner, although the stem 318 can extend in a non-rectilinear manner, such as sinusoidal, arcuate, or others. The stem 318 includes metal, but can include plastic, wood, rubber, or others. The stem 318 is hollow internally, such as a tube, but can be solid internally, such as when the camera 316 is hosted on the body 302 and a wiring for the camera 316 runs external or along the stem 318 or on the body 302. The stem 318 includes a sidewall that is solid, but can be perforated, meshed, latticed, or others. The stem 318 extends from the body 302 such that the stem 318 is co-aligned with the camera 316, but variations are possible, such as when the stem is not co-aligned with the camera 316, such as being offset with the camera 316. The stem 318 can have a closed end portion distal to the body 302 or an open end portion distal to the body 302. For example, when the stem 318 is internally hollow and has the open end portion distal to the body 302, then the stem 318 can contain the wire for the light sources 306 or the camera 316, such as to the controller 212 or a power source or others. The stem 318 has a circular cross-section, but such structure can vary, such as via the stem 318 having a square, triangle, rectangular, oval, pentagonal cross-sections or others. Note that the stem 318 can include depressions or projections. Further, the stem 318 can include a plurality of spikes outwardly extending therefrom in a radial manner, such as in order to aid in securing the board 300 into soil.

Note that the body 302 or the stem 318 can host a sensor configured to sense at least one of a presence or an absence of the vehicle 104 in operational proximity thereof. For example, the sensor can be an optical sensor other than the camera 316, a ultrasonic sensor, an ultrasound sensor, a laser sensor, a radar, a lidar, a heat sensor, an actuator, a mechanical linkage, a load cell, a pressure sensor, a ferromagnetic sensor, or others, whether powered by its own power source or other power source, such as a power source powering the light sources 306 or the camera 316. For example, the sensor can be coupled to the body 302 or the stem 318 via fastening, mating, interlocking, adhering, or others. In some embodiments, the sensor can be an all-weather sensor. Note that the sensor can be hosted via internal or external to the body 302 or the stem 318. Further, note that although FIG. 3C depicts various sizes corresponding to a length of the body 302 (900 centimeters) and a height of the walls 310 (50 centimeters), such dimensions are illustrative and can vary, whether greater or lesser.

Figure 4:
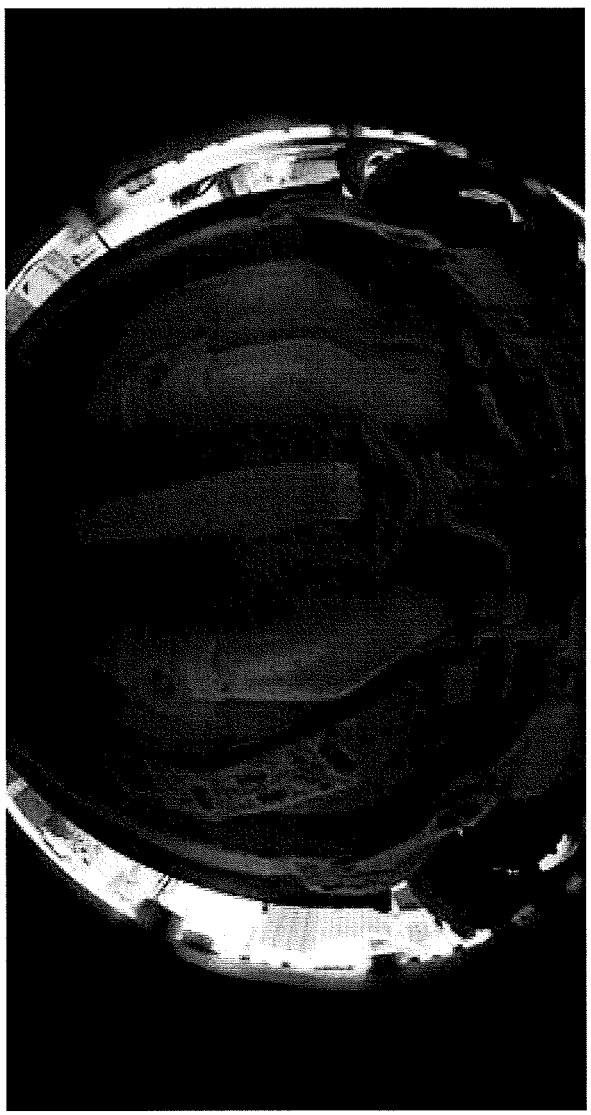
FIG. 4 shows an embodiment of an image that is distorted and depicts an undercarriage of a vehicle according to this disclosure.

FIG. 4 shows an embodiment of an image that is distorted and depicts an undercarriage of a vehicle according to this disclosure. In order to detect a presence of the vehicle 104 in proximity of or over the board 106, a set of processor-implemented actions are performed, which can be via the server 116. For example, such actions can involve an algorithm of video analytics performed by the server 116 on a video stream received from the board 106. When the board 106 hosts a camera with a wide angle lens, such as a fisheye camera, then the server 116 receives the video stream from the camera where the video stream is distorted, such as via a barrel distortion in a registered image or frame, as shown in a screenshot 400 of FIG. 4. Such distortion can make accurate image stitching complicated. Therefore, the set of processor-implemented actions can employ an algorithm to reduce or remove such distortion from the video stream, such as via reducing or removing a geometrical bending of a surface of an object, such as the undercarriage of the vehicle 104.

Figure 5:
FIG. 5 shows an embodiment of an image that has a barrel distortion and depicts a back portion of an undercarriage of a vehicle according to this disclosure.
Figure 6:
FIG. 6 shows an embodiment of an image that has barrel distortion dewarped and depicts a back portion of an undercarriage of a vehicle according to this disclosure.
Figure 7:
FIG. 7 shows an embodiment of an image that has some barrel distortion dewarped and depicts a back portion of an undercarriage of a vehicle according to this disclosure.

FIG. 5 shows an embodiment of an image that has a barrel distortion and depicts a back portion of an undercarriage of a vehicle according to this disclosure. FIG. 6 shows an embodiment of an image that has barrel distortion dewarped and depicts a back portion of an undercarriage of a vehicle according to this disclosure. FIG. 7 shows an embodiment of an image that has some barrel distortion dewarped and depicts a back portion of an undercarriage of a vehicle according to this disclosure. In particular, as explained above, when the board 102 hosts the camera with the wide angle lens, the imagery can be distorted, such as via a barrel distortion. For example, when a distance between the camera of the board 102 to the undercarriage of the vehicle 104 is between about 0.1 meter to about 0.2 meters, such as when the vehicle 104 has a low ground clearance, and when the vehicle 104 has a width of about 3 meters or less, then a camera-based inspection of the undercarriage of the vehicle 104 should allow for a viewing angle of about not less than 170 degrees. Further, if a wheel of the vehicle 104 should be available for the camera-based inspection, then such viewing angle should be about not be less than 180 degrees. Therefore, the board 102 hosting the camera with the wide angle lens provides an advantage of enabling such viewing angles. However, as noted above and shown as a screenshot 500 in FIG. 5, the imagery obtained in such manner is distorted. This distortion hinders accurate merging, stitching, or splicing of the imagery in order to obtain a single image of the undercarriage, as a whole, of the vehicle 104. Consequently, the server 116 runs or accesses a data source running a process to reduce, remove, eliminate, or minimize this distortion, which allows the server 116 to form or receive a rectilinear image, similar to a screenshot 600 of FIG. 6. The process to reduce, remove, eliminate, or minimize this distortion is disclosed in U.S. Pat. No. 9,547,883, which is fully incorporated by reference herein for at least these purposes and any other purposes disclosed in this disclosure. For example, the process to reduce, remove, eliminate, or minimize this distortion can enable the server 116 to form or access the imagery, as distorted, whether such distortion is partially or fully reduced, removed, eliminated, or minimized, i.e., a degree, an extent, or how much of distortion is reduced, removed, eliminated, or minimized is managed, controlled, or selected, which can via a user or based on heuristics or thresholds, as set in advance based on a set of criteria. For example, such imagery is shown in a screenshot 700 of FIG. 7, where some distortion is still remaining. Note that some remaining or residual distortion in the screenshot 700 is less stretched at edges compared to the screenshot 600, where the distortion is substantially or completely reduced, removed, eliminated, or minimized. As such, even in this circumstance, where a small residual distortion is present, the imagery can still be stitched into a single image, as further disclosed below.

Figure 8:
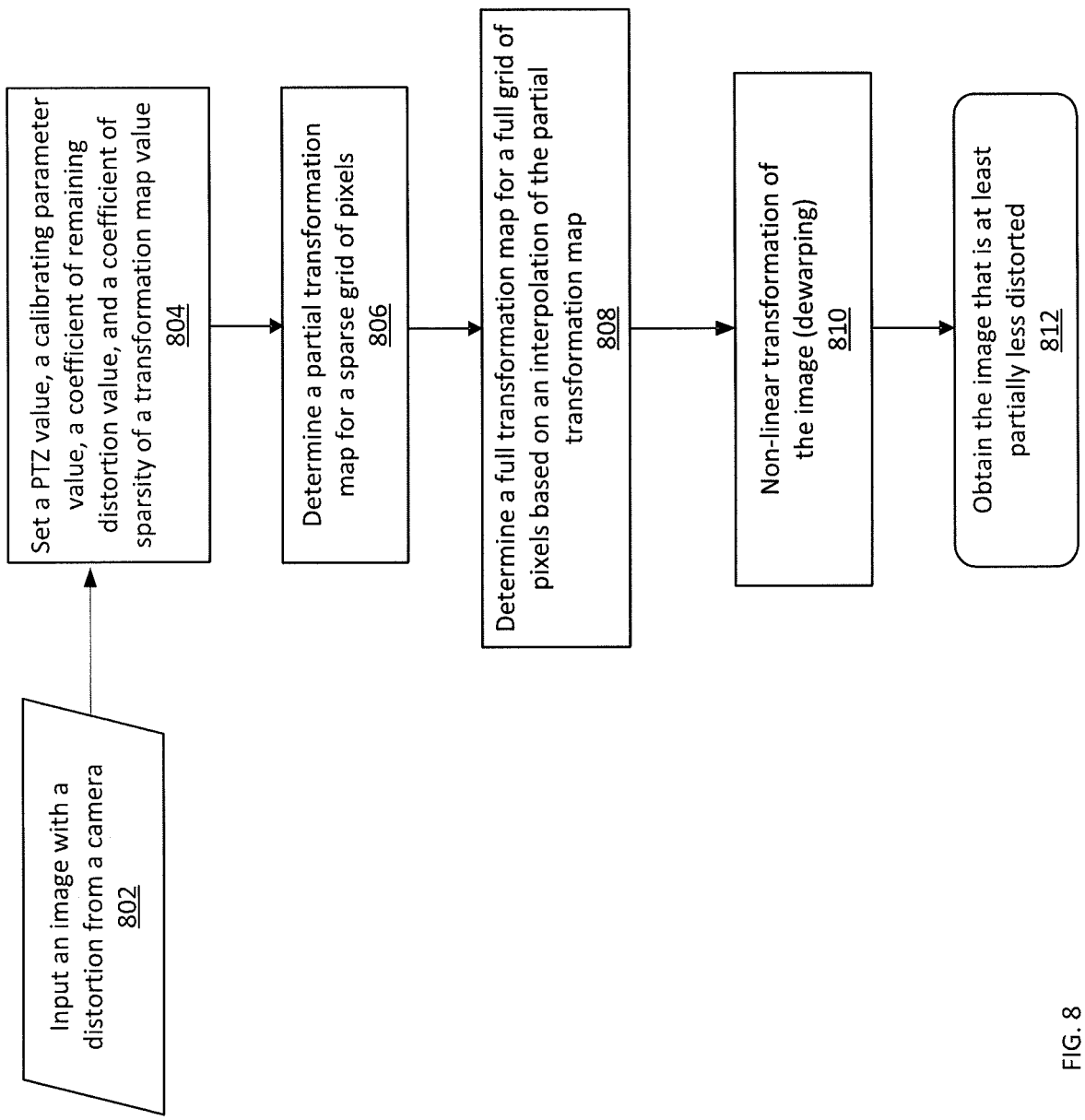
FIG. 8 shows an embodiment of a flowchart for dewarping an image according to this disclosure.

FIG. 8 shows an embodiment of a flowchart for dewarping an image according to this disclosure. In particular, a method 800 includes a plurality of blocks 802-812. The method 800 can employ the process to reduce, remove, eliminate, or minimize this distortion is disclosed in U.S. Pat. No. 9,547,883, which is fully incorporated by reference herein for at least these purposes and any other purposes disclosed in this disclosure. Although the process 800 is described in context of the server 116, other computing entities can perform this process.

In block 802, the server 116 receives an image with a distortion from a camera, such as from the board 106, the board 202, or the board 302. For example, the camera can be camera 316, as equipped with a wide angle lens, such as a fisheye lens. For example, the distortion of the image is as shown in the screenshot 400 or the screenshot 500.

In block 804, the server 116 sets a PTZ value, a calibrating parameter value, a coefficient of remaining distortion value, and a coefficient of sparsity of a transformation map value, as disclosed in U.S. Pat. No. 9,547,883, which is fully incorporated by reference herein for at least these purposes and any other purposes disclosed in this disclosure. For example the server 116 can perform this based on interaction with the workstation 120 based on a user input.

In block 806, the server 116 determines a partial transformation map for a sparse grid of pixels in the image, as disclosed in U.S. Pat. No. 9,547,883, which is fully incorporated by reference herein for at least these purposes and any other purposes disclosed in this disclosure.

In block 808, the server 116 determines a full transformation map for a full grid of pixels based on an interpolation of the partial transformation map, as disclosed in U.S. Pat. No. 9,547,883, which is fully incorporated by reference herein for at least these purposes and any other purposes disclosed in this disclosure.

In block 810, the server 116 performs a non-linear transformation of the image, such as via dewarping the image, as disclosed in U.S. Pat. No. 9,547,883, which is fully incorporated by reference herein for at least these purposes and any other purposes disclosed in this disclosure.

In block 812, the server 116 obtains the image that is at least partially less distorted than in the block 802, as disclosed in U.S. Pat. No. 9,547,883, which is fully incorporated by reference herein for at least these purposes and any other purposes disclosed in this disclosure.

Figure 9:
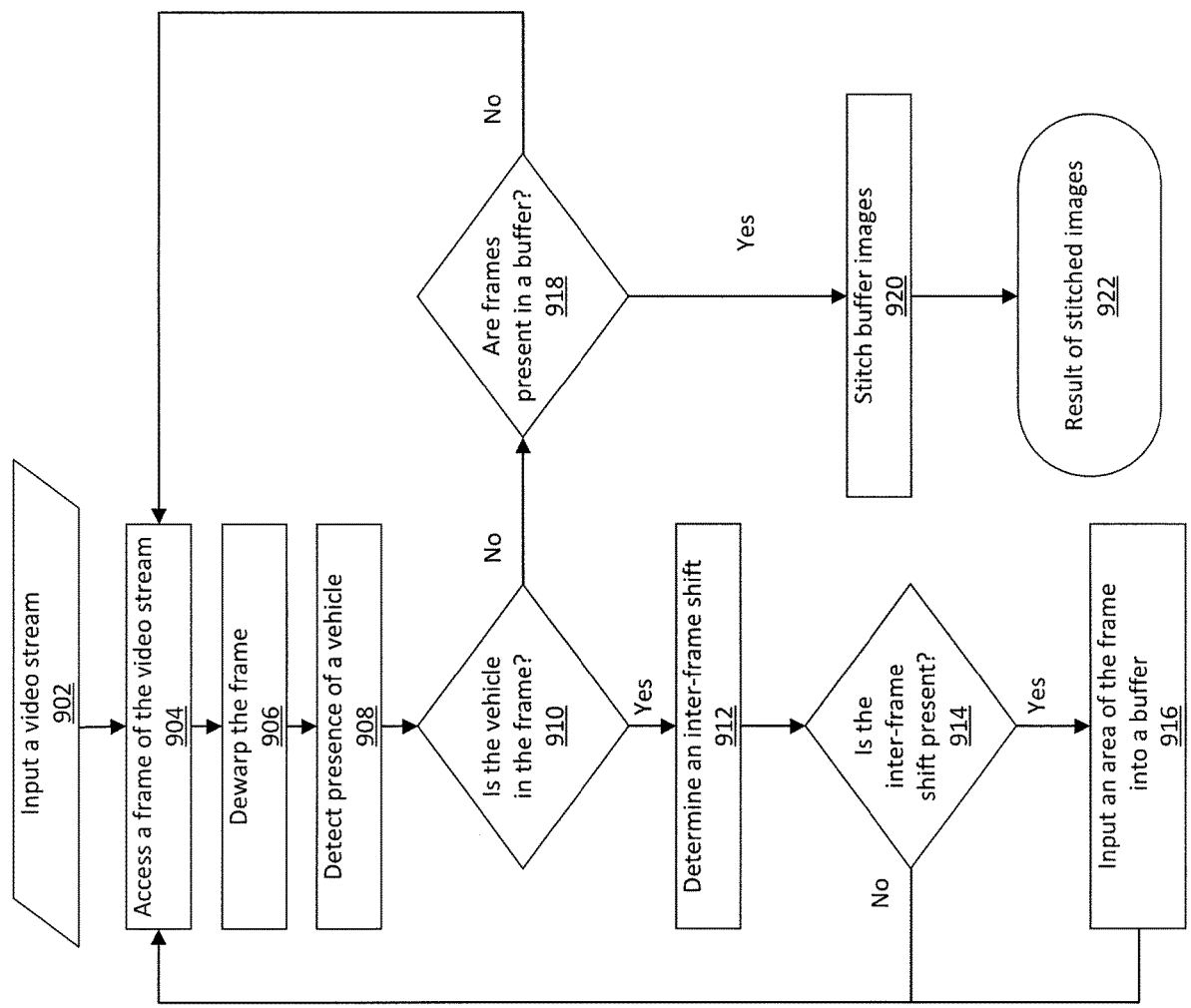
FIG. 9 shows an embodiment of a flowchart for stitching an image according to this disclosure.
Figure 10:
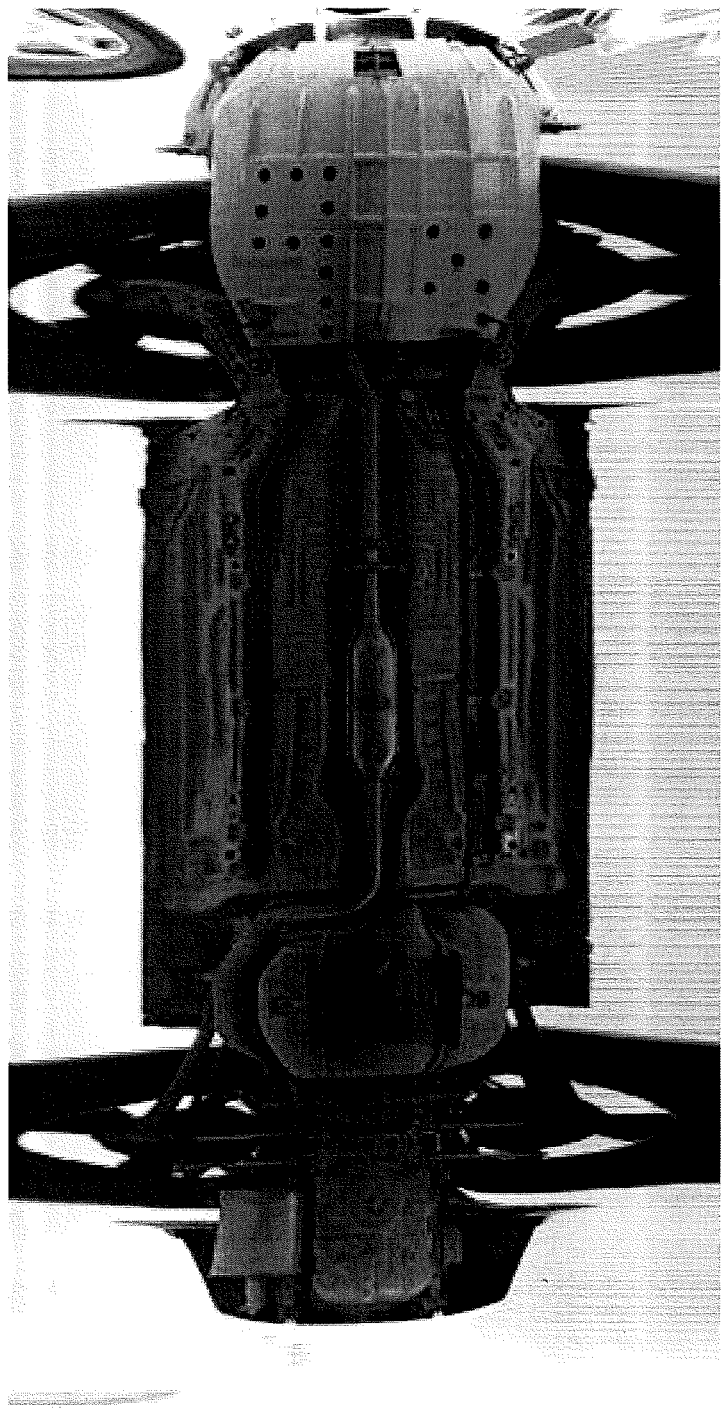
FIG. 10 shows an embodiment of an image of an undercarriage of a vehicle, where the image has been stitched according to this disclosure.

FIG. 9 shows an embodiment of a flowchart for stitching an image according to this disclosure. FIG. 10 shows an embodiment of an image of an undercarriage of a vehicle, where the image has been stitched according to this disclosure. In particular, a method 900 includes a plurality of blocks 902-922. The method 900 enables a detection of the vehicle 104 in a frame of the video stream obtained from the camera of the board 106, a formation of a full image of the undercarriage of the vehicle 104 during a movement of the vehicle 104 over the board 106, and a completion of the formation of the full image as the vehicle 104 leaves the field of view of the camera of the board 106. In order to determine when to start and when to end imaging of the undercarriage of the vehicle 104, the server 116 can employ a software-based motion detector.

In block 902, the server accesses a video stream from the camera of the board 106.

In block 904, the server 116 accesses frame from the video stream.

In block 906, the server 116 dewarps the frame, as disclosed herein.

In block 908, the server 116 detects a presence of the vehicle 104 in the frame, as dewarped. Such detection can include preprocessing of the frame to identify or emphasize an edge in the frame using a Sobel method or filter such that an image with emphasizing edges is formed. Then, the controller 114 performs a pixel-by-pixel comparison of the edges of the frame and a previous frame to identify an inter-frame shift based on a peak signal-to-noise ratio (PSNR) metric. One criteria based on which the presence of the vehicle 104 is detected in the video stream is a non-zero temporal shift between the frame and the previous frame.

In block 910, the server 116 determines if the vehicle is present. If yes, then block 912 is performed. If no, then block 918 is performed.

In block 912, the server 116 determines the inter-frame shift of the edges of the frame and the previous frame. For example, this can be done by determining such a shift on an X-axis at which the edges of the frame and the previous frame best or maximally correspond or match based on the PSNR metric. Once the inter-frame shift has been determined, the frame is image cropped, such as via an extraction of a central portion of the frame that has a width corresponding to an absolute value of the inter-frame shift.

In block 914, the server 116 determines if the inter-frame shift is present. If yes, then block 916 is performed. If no, then block 904 is performed.

In block 916, the server 116 inputs an area of the frame, as image cropped, into a buffer of frames for subsequent stitching.

In block 918, the server 116 determines if the buffer of frames is not empty. If yes, then block 920 is performed. If no, then block 904 is performed.

In block 920, the server 116 stitches the frame with other frames in the buffer of frames, such as via image stitching. For example, such stitching can be performed via a pixel-by-pixel blending of each pair of neighboring frames, such as via regions that overlay or overlap, from the buffer of frames using a cost function. For example, the server 116 can perform the pixel-by-pixel blending, such as feather blending or others, of frame intersecting regions of the buffer of frames. As such, only those frames are used for which the server 116 is able to provide a seamless stitching with a smooth transition from one frame to another frame.

In block 922, the server 116 obtains an image that is stitched from the buffer of frames. For example, this image is shown in a screenshot 1000 of FIG. 10.

Figure 11:
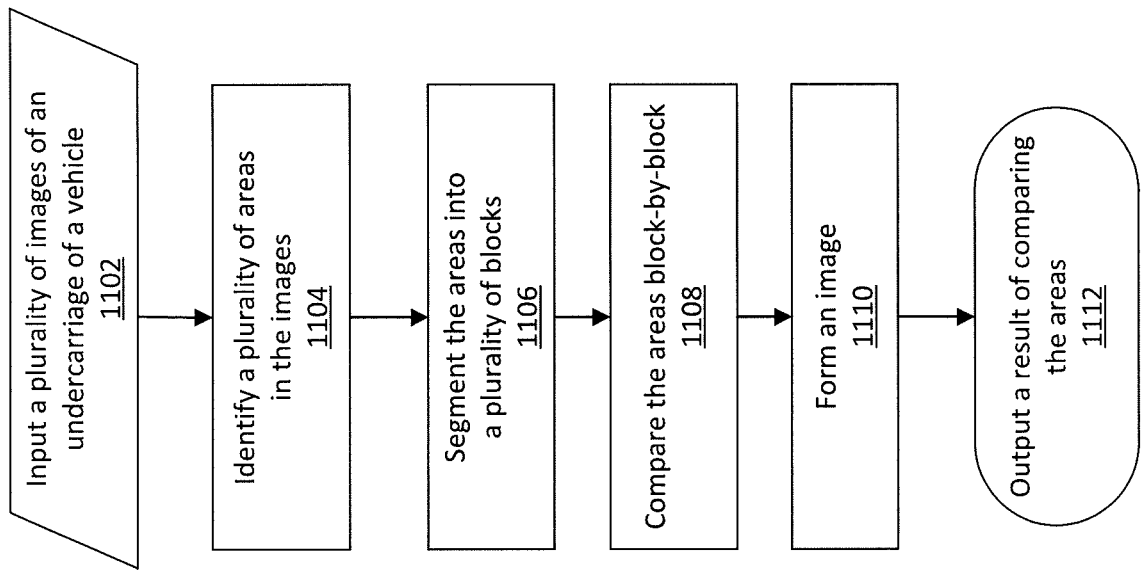
FIG. 11 shows an embodiment of a flowchart for comparing a plurality of images according to this disclosure.
Figure 12:
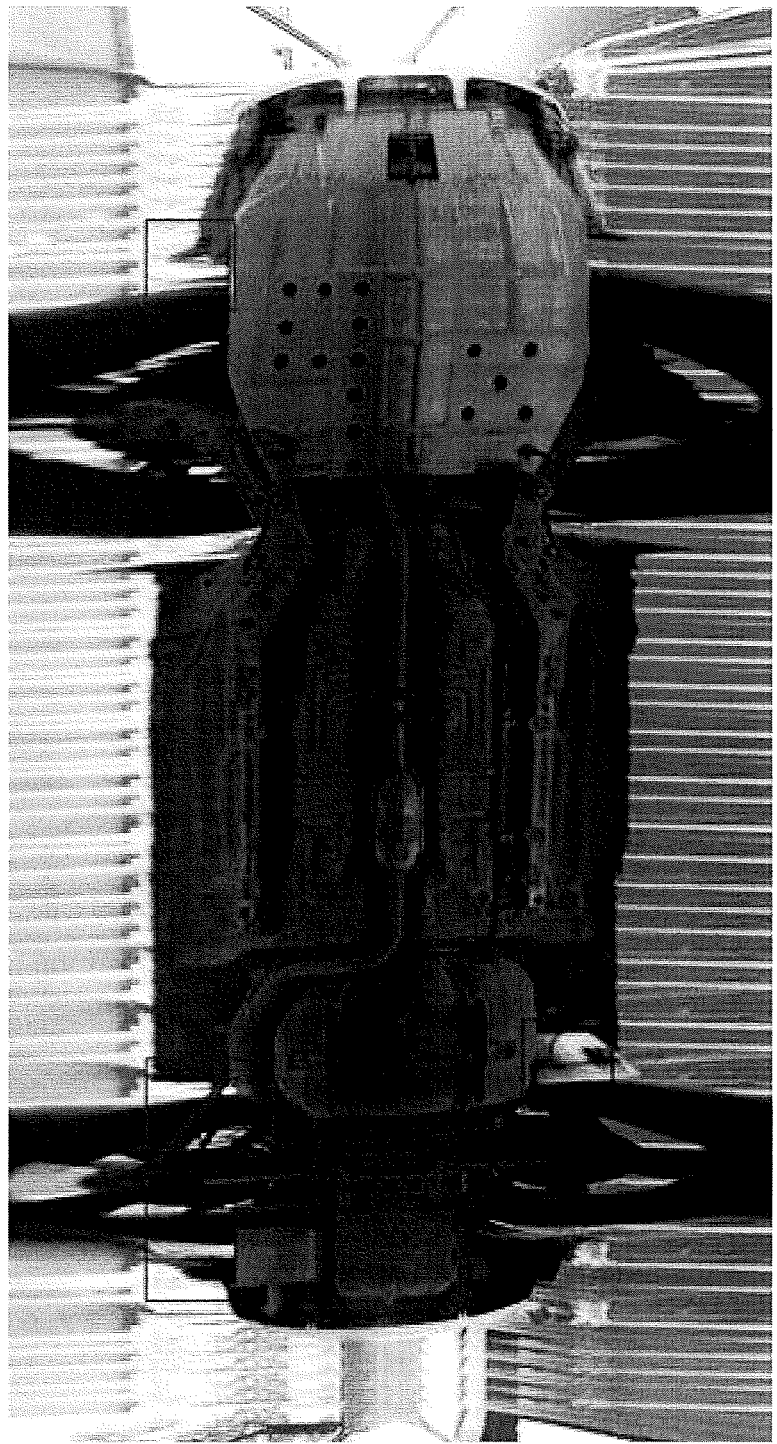
FIG. 12 shows an embodiment of a current image of an undercarriage of a vehicle noticeably depicting a plurality of deviations of the undercarriage from a template image of the undercarriage according to this disclosure.

FIG. 11 shows an embodiment of a flowchart for comparing a plurality of images according to this disclosure. FIG. 12 shows an embodiment of a current image of an undercarriage of a vehicle noticeably depicting a plurality of deviations of the undercarriage from a template image of the undercarriage according to this disclosure. In particular, a method 1100 includes a plurality of blocks 1102-1112. The method 1110 enables a comparison of a current image of the undercarriage of the vehicle 104, as the vehicle 104 is in operational proximity of the board 106, against a reference or template image of the undercarriage of the vehicle 104, as retrieved from the database based on the identifier of the vehicle 104. The method 1110 also enables a marking or augmenting of the current image based on a difference identified with respect to the reference or template image.

In block 1102, the server 116 accesses a plurality of images, which includes the current image and the template or the reference or template image.

In block 1104, the server 116 determines a plurality of regions of interest (ROI) in the images, such as a plurality of undercarriage portions. The ROIs are determined based on a result of an analysis of a background color distribution along a plurality of edges depicted on the images and the undercarriages in a plurality of central portions of the images. Note that the edges of the undercarriage can be identified using a Sobel method or filter.

In block 1106, the server 116 segments the ROIs into a plurality of blocks, such as a closed shape block, such as a square or rectangular block or others. For example, at least one of the blocks may have an area of about 5% of that ROI, although this can vary, whether higher or lower. Note that the blocks are identified with a 50% mutual overlap, although this can vary, whether higher or lower.

In block 1108, the server 116 runs a block-by-block comparison of the ROIs of the images. This comparison can be performed by comparing the current image against the template or reference image based on a principle of proximity, such as an initial selection is done based on a metric of L2 and a secondary selection is done based on a metric of L1. Therefore, those blocks that do not reach a satisfactory matching threshold based on the secondary selection are treated or flagged or logged as suspicious.

In block 1110, the server 116 forms an image where the image is marked or augmented with markings or augmentations based on those blocks that are treated as suspicious. As shown in a screenshot 1200 of FIG. 12, those markings or augmentations are presented as shapes over those area. Note that the markings are shown in red and solid lines extending in closed shapes, but can be shown differently, such in other colors, such as blue, white, orange, purple, or others, or as non-solid, such as broken lines, or as other shapes, such as circles, ovals, triangles, pentagons, octagons, hexagons, or others, or open shapes, such as a U-shape or others.

In block 1112, the server 116 outputs the image as marked or augmented, such as into a database or onto a display. For example, the image as marked or augmented can be presented in the GUI 122 of FIG. 1.

As such, for example, the system 100 can enable an automated visual inspection of the undercarriage of the vehicle 104 and a receipt of documentary proof in a form of a corresponding image of the undercarriage with reference to a date and time of travel of the vehicle 104, along with the identifier thereof. Further, there is less need for an inspector to be positioned near the vehicle 104. Moreover, the system 100 enables the automated visual inspection in a two-way mode, i.e. upon entry or exit of the vehicle 104. Also, a use of a non-line-scan camera is beneficial because (1) non-uniform speed of the vehicle 104 does not lead to image stretching along a direction of motion of the vehicle 104, (2) temporary stoppage of the vehicle 104 in the field of view of the camera of the board 106 does not negatively affect the imagery therefrom, (3) some, many, most, or all comings and goings of the vehicle 104 are recorded and archived for subsequent detailed analysis of the undercarriage of the vehicle 104. Some versions of the system 100 minimize a use of physical sensors to sense the vehicle 104, such as an induction loop, an infrared or ultrasonic sensor, or others. Moreover, the light sources on the board 106, 202, or 300 can operate in a standby mode and thereby provide energy savings, while reducing or eliminating discomforts to drivers or human inspectors, such as visually. Similarly, the board 106, 202, or 300 (1) can be compact in size (flat housing design allows for a passage of the vehicle 104 with low ground clearance, (2) does not require labor-intensive installation (only affects a small road section), (3) can be easy to maintain (periodic cleaning or washing of the dome of the camera and protective cover or lens of the light sources, and (4) employs the walls 310 to protect the dome from impact with a wheel of the vehicle 104.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein. As used herein, the term "about" and/or "substantially" refers to a +/−10% variation from the nominal value/term. Such variation is always included in any given.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A device comprising:
   a board;
   a single camera positioned within the board, wherein the camera is configured to image an undercarriage based on the undercarriage moving over the camera while the board remains stationary relative to the undercarriage;
   a light source positioned within the board, wherein the light source is configured to illuminate the undercarriage based on the undercarriage moving over the light source while the board remains stationary relative to the undercarriage; and
   a stem extending from the board away from the undercarriage when the undercarriage is positioned over the camera.

2. The device of claim 1, wherein the stem extends from the board such that the stem and the board form a T-shape.

3. The device of claim 1, further comprising:
   a dome extending from the board, wherein the dome covers the camera, wherein the dome is transparent.

4. The device of claim 3, further comprising:
   a plurality of walls extending from the board, wherein the dome is positioned between the walls.

5. The device of claim 1, wherein the camera includes a wide-angle lens.

6. The device of claim 1, wherein the light source is a plurality of light sources.

7. The device of claim 6, wherein the light sources are distributed about the camera in a closed shape.

8. The device of claim 6, wherein the light sources are configured to illuminate in a constant lighting mode without pulsing.

9. The device of claim 6, wherein the light sources are configured to illuminate in a pulsed lighting mode that is synchronized with the camera based on a frequency.

10. The device of claim 6, wherein the light sources are flush with the board.

11. The device of claim 1, wherein each of the board and the stem includes a metal.

12. A method comprising:
    accessing, by a processor, a first imagery of an undercarriage of a vehicle from a first camera and a second imagery of an identifier of the vehicle from a second camera, wherein the first imagery is received from a single camera including the first camera, wherein the first camera has a first imaging axis, wherein the second camera has a second imaging axis, wherein the first imaging axis is distinct from the second imaging axis, wherein the first camera is hosted via a board positioned below the undercarriage, wherein the board has a stem extending therefrom away from the undercarriage when the undercarriage is positioned over the camera;
    dewarping, by the processor, the first imagery;
    stitching, by the processor, the first imagery such that a first image is formed, wherein the first imagery is stitched after the first imagery is dewarped;
    extracting, by the processor, a set of symbols corresponding to the identifier from the second imagery;
    storing, by the processor, the first image and the set of symbols in a database such that the first image is retrievable based on the set of symbols;
    retrieving, by the processor, the first image from the database based on the set of symbols;
    comparing, by the processor, a second image against the first image, wherein the second image depicts the undercarriage;
    identifying, by the processor, a difference between the second image and the first image; and
    requesting, by the processor, a display to present the second image with the difference being marked.

13. The method of claim 12, further comprising:
    segmenting, by the processor, each of the first image and the second image into a plurality of blocks, wherein the second image is compared against the first image on a block-by-block basis.

14. The method of claim 12, wherein the board and the stem form a T-shape thereby.

15. The method of claim 12, wherein the board hosts a light source illuminating the undercarriage.

16. The method of claim 12, wherein the board includes a pair of walls extending therefrom, wherein the first camera is positioned between the walls.

17. The method of claim 12, wherein the board hosts a dome, wherein the first camera is covered by the dome.

18. The method of claim 12, wherein the first camera is not a line-scan camera.

19. The method of claim 18, wherein the first camera includes a wide-angle lens.

20. The method of claim 12, wherein the difference is marked via a closed shape.

21. The method of claim 19, wherein the closed shape is visually distinct relative to the undercarriage depicted in the second image.

22. The method of claim 12, wherein the difference is marked with an open shape.

23. The method of claim 12, wherein the second image is compared against the first image based on a principle of proximity.

24. The method of claim 12, wherein each of the board and the stem includes a metal.

25. A method comprising:
    receiving, by a processor, a first imagery of an undercarriage of a vehicle from a first camera and a second imagery of an identifier of the vehicle from a second camera, wherein the first imagery is received from a single camera including the first camera, wherein the first camera has a first imaging axis, wherein the second camera has a second imaging axis, wherein the first imaging axis is distinct from the second imaging axis, wherein the first camera is hosted via a board positioned below the undercarriage, wherein the board has a stem extending therefrom away from the undercarriage when the undercarriage is positioned over the camera;
    dewarping, by the processor, the first imagery;
    stitching, by the processor, the first imagery such that a first image is formed, wherein the first imagery is stitched after the first imagery is dewarped;
    extracting, by the processor, a set of symbols corresponding to the identifier from the second imagery;
    storing, by the processor, the first image and the set of symbols in a database such that the first image is retrievable based on the set of symbols;
    retrieving, by the processor, the first image from the database based on the set of symbols;
    comparing, by the processor, a second image against the first image, wherein the second image depicts the undercarriage; and
    requesting, by the processor, a motor to activate responsive to no substantial difference between the second image and the first image being determined.

26. The method of claim 25, further comprising:
    segmenting, by the processor, each of the first image and the second image into a plurality of blocks, wherein the second image is compared against the first image on a block-by-block basis.

27. The method of claim 25, wherein the board and the stem form a T-shape thereby.

28. The method of claim 25, wherein the board hosts a light source illuminating the undercarriage.

29. The method of claim 25, wherein the board includes a pair of walls extending therefrom, wherein the first camera is positioned between the walls.

30. The method of claim 25, wherein each of the board and the stem includes a metal.

\* \* \* \* \*